United States Patent [19]

Doll

[11] 4,168,097
[45] Sep. 18, 1979

[54] WIND SHIELD ADAPTER FOR MOTORCYCLE FAIRING

[76] Inventor: Ronald L. Doll, 2619 Santa Monica Blvd., Santa Monica, Calif. 90404

[21] Appl. No.: 865,228

[22] Filed: Dec. 28, 1977

[51] Int. Cl.² .............................................. B62J 17/02
[52] U.S. Cl. ................................ 296/78.1; 280/289 S
[58] Field of Search ................ 296/84 R, 78 R, 78.1, 296/82; 280/289 S

[56] References Cited

U.S. PATENT DOCUMENTS

| 3,901,549 | 8/1975 | Ramirez | 296/78.1 |
| 4,066,290 | 1/1978 | Wiegert et al. | 296/78.1 |

*Primary Examiner*—Richard A. Bertsch
*Attorney, Agent, or Firm*—William W. Haefliger

[57] ABSTRACT

A motorcycle wind shield has two sections the mid portion of which are joined together, the two sections defining openings to receive tines of the steering fork, the sections closable about the tines, the shield cooperating with a motorcycle fairing.

6 Claims, 4 Drawing Figures

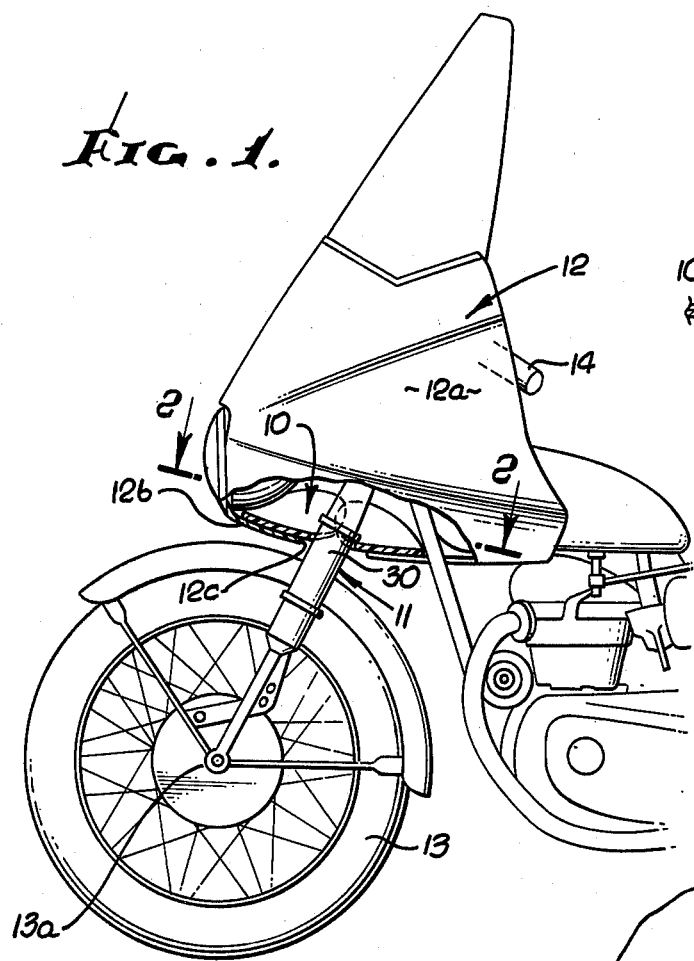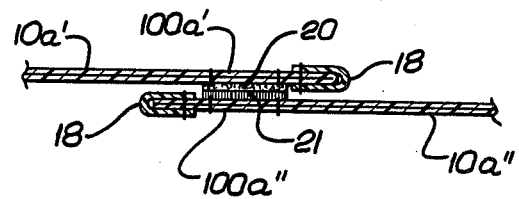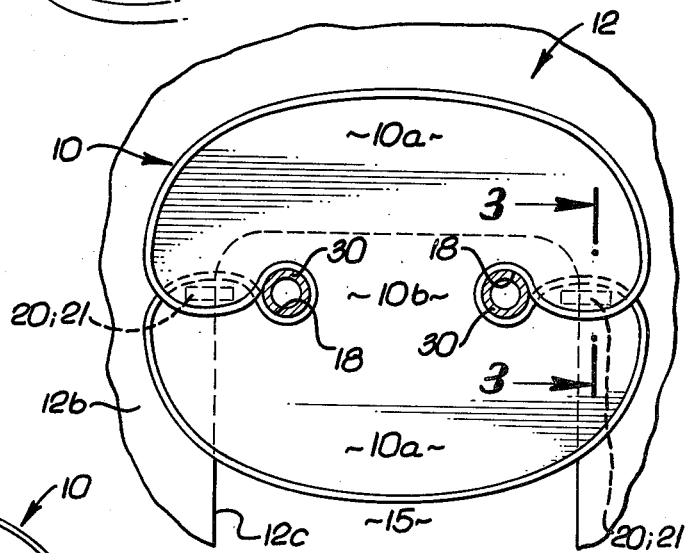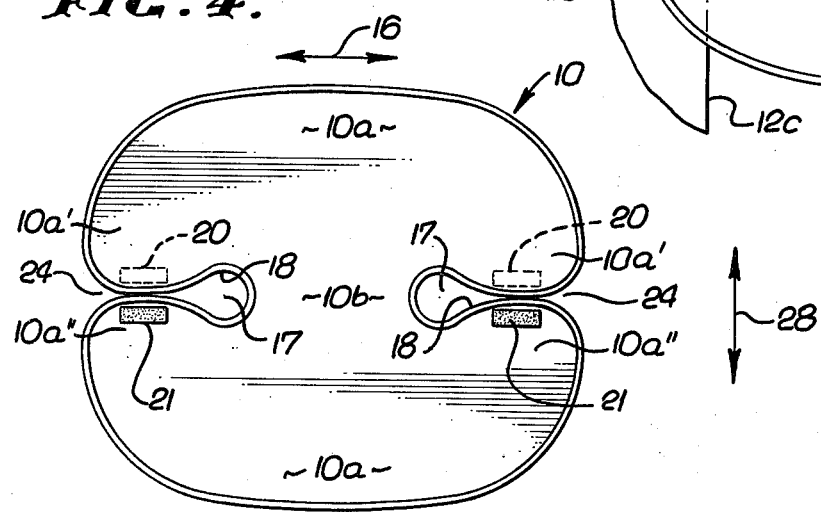

WIND SHIELD ADAPTER FOR MOTORCYCLE FAIRING

BACKGROUND OF THE INVENTION

This invention relates generally to motorcycle wind screens, and more particularly concerns the provision of a flexible flap which cooperates with a fairing and with a motorcycle front wheel fork to block or deflect wind passage up through the underside of the fairing and into contact with the rider.

One of the major discomforts to motorcycle touring is wind impingement on the rider, especially at higher speeds. As a result, fairings typically made of molded plastic have come into use, these being mounted on the motorcycle to surround the hand grip area and to carry wind shields. However, such fairings do not extend close to the fork that leads to the front wheel, because they do not rotate with the fork as the rider steers the motorcycle. As a result wind can and does pass upwardly through the gap or opening between the fairing and fork to impinge on the rider. Prior to the present invention, no way was known to prevent this, in the unusually advantageous manner as now afforded by the invention.

SUMMARY OF THE INVENTION

It is a major object of the invention to provide a flap which cooperates with the fork and fairing to block wind flow to impinge on the rider's upper body and face, the flap constructed to function despite turning of the fork relative to the fairing.

Basically, the novel shield comprises:

(a) a flexible flap comprising two laterally elongated sections the mid-portions of which are joined together, (b) said sections having lateral portions which are longitudinally opposed and define two openings for receiving the tines of said fork, said openings laterally spaced apart, (c) and means on said sections to interconnect said opposed portions thereof to close said lateral portions toward one another, reducing the sizes of said openings so that said portions fit snugly about said tines.

As will appear, the laterally opposed portions typically have terminals which project longitudinally toward one another to accommodate their interconnection; the flap is sized to be supported by and to overlap the upper surface of the fairing bottom wall, and to have slip engagement with that surface to allow for turning of the fork and flap relative to the fairing; the flap opposed portions are adapted to be brought into overlapping relation to facilitate their removable interconnection, as by VELCRO strips, for example, whereby the flap then snugly engages the fork tines or columns; and the flap may be made of leather to provide sealing weight.

These as well as other objects and advantages of the invention, as well as the details of an illustrative embodiment, will be more fully understood from the following description and drawings, in which:

DRAWING DESCRIPTION

FIG. 1 is a side elevation, partly in section, showing a motorcycle incorporating the invention;

FIG. 2 is a plan view taken in section on lines 2—2 of FIG. 1;

FIG. 3 is an enlarged fragmentary section on lines 3—3 of FIG. 2; and

FIG. 4 is a plan view of the wind shield adapter prior to its installation on a motorcycle.

DETAILED DESCRIPTION

The wind shield adapter 10 shown in the drawings is adapted to cover the gap between a motorcycle front wheel support fork 11 and wind screen fairing 12. The fork includes two parallel columns 30 that extend downwardly and forwardly toward the axle area 13a of front wheel 13. The fairing 12 typically includes plastic or other sheet material extending rearwardly at 12a at both sides of the handle grips 14, and downwardly at 12b underneath the handlebars. It is cut-away at 12c to form an opening 15 through which the fork columns project, and it is an object of the invention to provide a wind screen adapter 10 to substantially cover the opening 15 so as to block rushing air entrance upwardly through the opening 15 and toward the rider.

The wind shield adapter 10 basically comprises a flexible flap that includes two sections, as at 10a, which are laterally elongated in the directions of arrows 16, the sections being joined together at their mid-portions, as for example at 10b. The sections 10a have lateral portions 10a' and 10a'' which are longitudinally opposed and define two laterally spaced openings 17 of variable size, depending upon the positions of portions 10a' relative to portions 10a''. The openings are adapted to receive the fork columns or tines 30 as they are received through the slots or spaces between section portions 10a' and 10a''. The longitudinal dimension is indicated by arrows 28, and the slots are designated at 24 in FIG. 4.

Also provided are means on the sections 10a to interconnect the opposed portions, i.e. each portion 10a' with an opposed portion 10a'', to close the lateral portions relatively toward one another and thereby reduce the sizes of the openings 17 so that the columns or tines 30 are snugly fitted or enclosed by the edges of portions 10a' and 10a'', and of the sections 10a which define the openings 17. Such edges are generally designated at 18 in FIG. 2, and may be formed by folds or hems at the periphery of the adapter 10. Accordingly, wind is prevented from entering the rider area via opening 15.

In this regard, the portions 10a' and 10a'' may have terminals that project longitudinally toward one another to accommodate their interconnection. As shown in FIG. 4, such terminals bulge toward one another, and their edge contours are arcuate and convex, merging into the edge contours of the openings 17.

The means to interconnect the opposite portions 10a' and 10a'' may advantageously comprise VELCRO strips located for example on the bulging terminals of portions 10a'', and on the oppositely bulging terminals of portions 10a'. In FIG. 3 the terminals are designated at 100a' and 100a'', and the VELCRO strips at 20 and 21. Interconnection is effected, as in FIG. 2, by relatively displacing the terminals 100a' and 100a'' into overlapping relation to overlap and interconnect the VELCRO strips 20 and 21, to an extent that effects partial closing of the openings 17 so as to snugly interfit the edges 18 to and about the columns or tines 30.

In FIGS. 1 and 2, the flap 10 overlaps and seats downwardly against the fairing bottom extent 12b partially surrounding the cut-away 15. The flap may consist of leather or other heavy flexible material so that its weight tends to hold it down against the fairing bottom, resisting wind induced displacement. At the same time, the flap can slip on the fairing surface as the flap is turned by the fork. Also, the snug gripping of the columns 30 by the flap, as described, aids in holding the flap in position, and in turning of the flap by the fork.

Note that the flap has overall oval shape, the long axis of the oval passing through the openings 17.

I claim:

1. A wind shield adapted to cover the gap between a motorcycle front wheel support fork and a motorcycle wind screen fairing, comprising
   (a) a flexible flap comprising two laterally elongated sections the mid-portions of which are joined together,
   (b) said sections having lateral portions which are longitudinally opposed and define two openings for receiving the tines of said fork, said openings laterally spaced apart,
   (c) and means on said sections to releasably interconnect said opposed portions thereof to close said lateral portions toward one another, reducing the sizes of said openings so that said portions fit closely about said tines,
   (d) said laterally opposed portions having terminals which project longitudinally toward one another to accommodate said interconnections,
   (e) said flap sections being joined together by flap extent intermediate said openings.

2. The wind shield of claim 1 wherein said means comprises VELCRO strips on said terminals.

3. The wind shield of claim 1 including said motorcycle, with said fairing supporting outer portions of said flap, said opposed portions overlapping one another.

4. The wind shield of claim 3 wherein the flap has slip engagement with the surface of the fairing.

5. The wind shield of claim 4 wherein the flap is oval shaped, the long axis of the oval passing through said openings.

6. The wind shield of claim 1 wherein said flap consists of leather.

* * * * *